J. R. HICE.
Improvement in Fire-Kindlers.
No. 115,205.  Patented May 23, 1871.
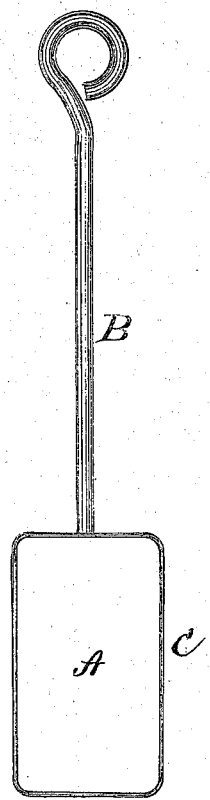

UNITED STATES PATENT OFFICE.

JOSEPH R. HICE, OF SALEM, OHIO.

IMPROVEMENT IN FIRE-KINDLERS.

Specification forming part of Letters Patent No. 115,205, dated May 23, 1871.

*To all whom it may concern:*

Be it known that I, JOSEPH R. HICE, of Salem, in the county of Columbiana and in the State of Ohio, have invented certain new and useful Improvements in Fire-Kindling; and do hereby declare that the following is a full, clear, and exact description thereof, reference being had to the accompanying drawing and to the letters of reference marked thereon making a part of this specification.

The nature of my invention consists in a composition for fire-kindler, consisting of earth, sawdust, and salt. These ingredients are mixed in suitable proportions and molded into blocks A of any desired size and shape. B represents a wire rod or handle, which extends all the way through a metallic band, C, which incloses the compound. The handle being riveted to the band prevents the compound from being broken or becoming disengaged in passing the kindler through the grates of a fire-place.

I do not broadly claim a bulb or ball of porous or non-combustible substance or compound, saturated with inflammable material and provided with a rod or handle, as seen in the patent of H. K. Horton, dated February 9, 1869.

What I do claim is—

The combination of the rod or handle B and metallic band C inclosing a fire-kindling compound, all substantially as set forth.

In testimony that I claim the foregoing I have hereunto set my hand and seal this 23d day of December, 1870.

JOSEPH R. HICE. [L. S.]

Witnesses:
CORNELIUS CURRY,
SAMUEL GROSE.